Dec. 19, 1939.   H. C. KRAUSS   2,184,190
HYDRAULIC SHOCK ABSORBER
Filed Nov. 27, 1937
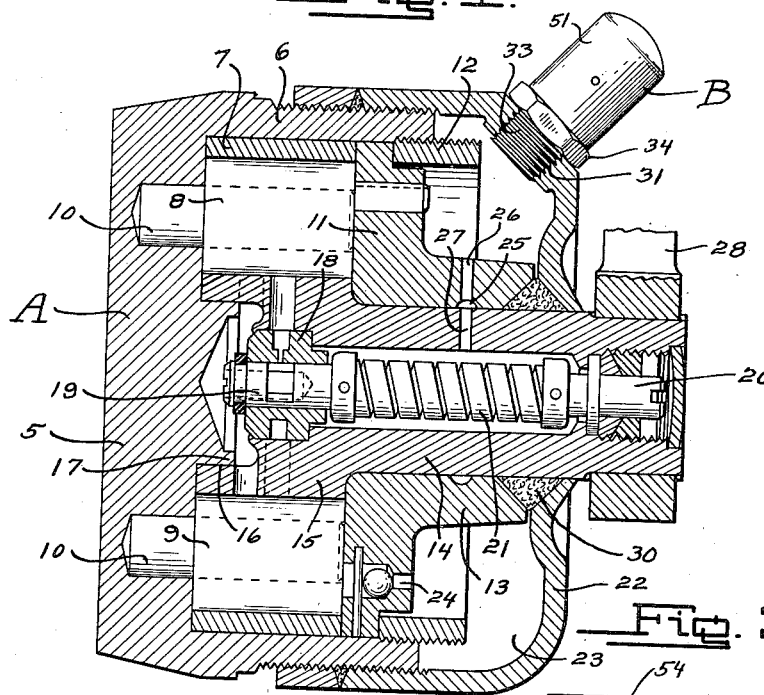
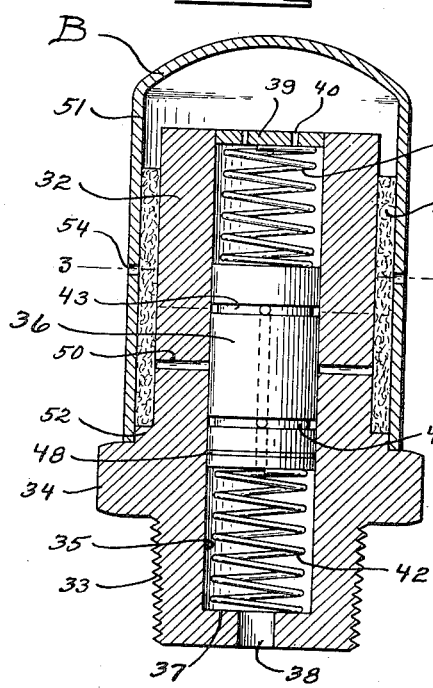
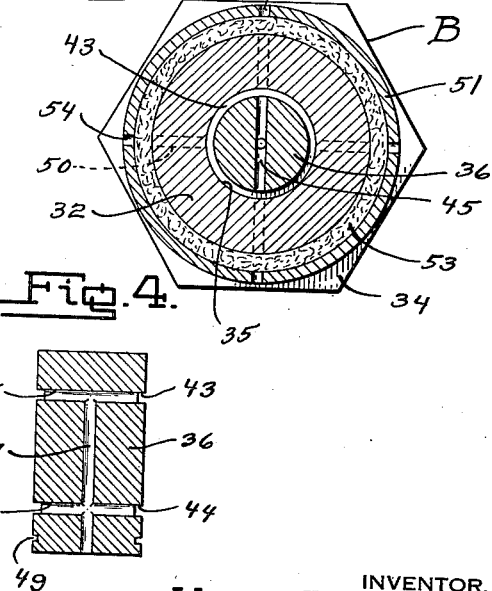
INVENTOR.
Harry C. Krauss.
BY Lancaster, Allwine and Rommel
ATTORNEYS.

Patented Dec. 19, 1939

2,184,190

UNITED STATES PATENT OFFICE 2,184,190

HYDRAULIC SHOCK ABSORBER

Harry C. Krauss, Oxford, Pa., assignor of one-half to Charles J. Green, Oxford, Pa.

Application November 27, 1937, Serial No. 176,935

6 Claims. (Cl. 188—89)

The present invention relates to hydraulic shock absorbers and more particularly to shock absorbers of this type having a thermostatically controlled valve means for automatically controlling the flow of the resistance fluid in accordance with temperature changes.

In the use of hydraulic shock absorbers particularly upon motor vehicles, on a large number of occasions it has been called to my attention that the shock absorbers become very noisy and create a rough riding condition after a comparatively short period of operation. Investigation revealed that the wing shaft of the shock absorber had become frozen or rigid and that the resistance fluid was leaking past the wing shaft gasket.

Thru actual experience I have found that the failure in shock absorbers of this type is due to the expansion of the resistance fluid in the main chambers of the shock absorber. The expansion of this fluid creates a high pressure in the main or working chambers and the supply chamber or reservoir of the shock absorber, preventing proper and efficient operation thereof. I have found from experience that this excess pressure causes a freezing of the wing shaft and which in turn aside from causing hard riding conditions and noise, will cause the shock absorber arm to break or pull the connecting link loose.

I have found that by releasing the pressure from the supply reservoir, thru removal of the usual filler plug, that such remedied the rigid or frozen condition of the wing shaft and permitted the shock absorber to return to normal operation and continue to function properly until a pressure again formed in the shock absorber. This building up of pressure in the shock absorber is caused by expansion of the resistance fluid due to external temperatures and also by the internal friction of the fluid passing from one chamber to the other in the shock absorber.

I have found from experience that the pressure created by expansion of the fluid also causes the fluid to be forced along the wing shaft by the packing and packing nut, causing a leak of the fluid at this point and which if allowed to continue, will cause a serious leak of the fluid such as will render the shock absorber unfit for further efficient use. Leaking at the wing shaft was formerly believed to have been caused by natural wear of the wing shaft and the cover gasket.

I have also found from experience that upon release of this excess pressure created by the expansion of the resistance fluid at high temperatures, a vacuum will be created at low temperatures which if allowed to exist, will impair the usefulness of the shock absorber thru collection of air in the working chambers thereof.

I have further found that in some types of hydraulic shock absorbers having certain forms of thermostatic control valves for automatically controlling the flow of fluid from one compartment to the other in the main chamber of the shock absorber, the pressure which has built up in the shock absorber will not permit the control valve to release due to the pressure acting against the valve, and which results in the wing-shaft becoming rigid due to the resistance created by the control valve being totally closed. This condition creates rough riding in the vehicle and if allowed to continue, will bend or break the shock absorber arm and connecting links or otherwise result in premature damage to the shock absorber.

Hydraulic shock absorbers such as are in general use upon motor vehicles are provided with filler openings thru which the resistance fluid is supplied, usually into a replenishing chamber or reservoir of the shock absorber. These filler openings are closed by a removable filler plug which in most cases are solid plugs, while other plugs are provided with vent apertures. With the solid filler plugs, expansion of the resistance fluid creates an undesirable pressure in the shock absorber at high temperatures thus impairing efficient operation of the shock absorber. While the filler plugs which are provided with vent apertures will serve for preventing pressures forming in the shock absorber, such vented filler plugs have not been very desirable for various reasons. The vent opening, because of its small size, is likely to become clogged, thus acting as a solid plug, and if the opening remain open, dirt and grit is permitted to enter and mix with the resistance fluid with the result that the small fluid exchange passages in the shock absorber soon become clogged, and the operating parts of the shock absorber soon become worn. The vented filler plugs also permit loss of the resistance fluid while the shock absorber is either in use or in shipment.

It is therefore a principal object of the present invention to provide means in a hydraulic shock absorber whereby the failure as noted above will be eliminated and greater operating efficiency obtained.

A further object of the invention is to provide in a hydraulic shock absorber, a device which will function to automatically maintain a balance between excess pressure and sub-normal vacuum within the shock absorber.

A further object of the invention resides in the provision of an equalizing valve device adapted to be substituted for the regular filler plugs of hydraulic shock absorbers which will act to release excess pressure and relieve vacuum, and yet maintain a seal between the supply reservoir and the exterior of the shock absorber so as to prevent entrance of foreign matter and also the loss of fluid while the shock absorber is in use or during shipment.

A further object resides in the provision of an equalizing valve device which may be readily incorporated in existing hydraulic shock absorbers, as well as those now in production without requiring any alterations whatever being made to the shock absorber.

A still further object of the invention is to provide a simple and efficient control valve device of this character embodying means for filtering the intake of air so as to prevent entrance of foreign matter into the valve device and the shock absorber.

Other objects and advantages of the invention will be apparent from the following detailed description taken in connection with the accompanying drawing forming a part of this specification and in which drawing:—

Figure 1 is a vertical longitudinal section of a hydraulic shock absorber of the "Houdaille" type such as disclosed in U. S. Patent Number 2,004,902 and showing my invention applied thereto.

Figure 2 is an enlarged longitudinal section thru the equalizing valve device detached.

Figure 3 is a transverse section on line 3—3 of Figure 2.

Figure 4 is a longitudinal section thru the piston or valve member at a right angle to the showing of the piston in Figure 2.

Referring to the drawing in detail and wherein like reference characters designate corresponding parts thruout the several views, the invention has been shown by way of example applied to a hydraulic shock absorber of the rotary type such as disclosed in U. S. Patent Number 2,004,902. The letter A may designate the shock absorber and B the valve device of this invention.

The shock absorber A comprises a base 5 having the cylindrical wall 6 extending therefrom, the base 5 being adapted for mounting such as upon the chassis of a vehicle. Fitting within the wall 6 is a ring 7 having upper and lower partition lugs 8 and 9 thru which pins 10 extend for securing the lugs to the base 5. Fitting into the outer end of the wall 6 and abutting the ring 7 is an outer wall 11 secured in place by a ring nut 12. Extending outwardly from the wall 11 is a tubular bearing 13 in which is journaled a hollow wing shaft 14 provided at its inner end with a hub 15 having a bearing pocket 16 for receiving the bearing lug 17. The hub 15 is provided with the usual radially extending piston members (not shown) which oscillate in the working chambers formed between the partition lugs 8 and 9, the piston members being provided with check valves as in usual practice. Mounted in the inner end of the hollow wing shaft 14 is a valve seat block 18 in which is journaled a cylindrical valve plug 19 for determining the resistance to the flow of the resistance fluid, particularly from the high pressure chambers to the low pressure chambers of the shock absorber, all as set forth in the above mentioned Patent Number 2,004,902. Mounted in the outer end of the hollow wing shaft 14 is an adjusting head 20 to which the outer end of a thermostatic element 21 is secured, the inner end of this element being secured to the valve plug 19 whereby the valve plug will be rotated by the thermostatic element 21 in response to temperature changes.

Threaded upon the annular wall 6 is a cup-shaped shell 22 providing a supply or replenishing chamber 23 from which the resistance fluid may flow thru check valve controlled passages 24 into the working chambers of the shock absorber. The tubular bearing 13 has an annular groove 25 surrounding the wing shaft 14 for collecting leakage along the shaft and returning it to the reservoir 23 thru a passage 26. A passage 27 thru the wing shaft 14 serves to return any fluid leaking into the shaft, back to the reservoir 23. The wing shaft 14 projects thru the cover or shell 22 for attachment of an operating arm 28, and a packing gasket 30 encircles the wing shaft between the shell and the outer end of the bearing 13 for preventing escape of fluid to the exterior of the shock absorber.

The replenishing chamber or reservoir 23 is normally filled thru an opening 31 provided in the cover or shell 22 and this opening is normally closed by a filler plug threaded into the opening. In the present invention, the usual form of either a solid or a vented filler plug is dispensed with and an improved plug in the form of an equalizing valve device substituted such as will provide for greater efficiency in operation and durability of the shock absorber.

Referring now to the specific construction and operation of the equalizing valve device B, the same comprises a cylindrical valve body or barrel 32 provided at its inner end with a threaded portion 33 for threading into the filler opening 31 of the shock absorber. A wrench shoulder 34 is formed above the portion 33 for receiving a wrench whereby the device may be applied and removed. Reciprocally movable in the chamber 35 of the valve body 32 is a piston or valve member 36 biased in opposite directions so as to normally assume an intermediate closed position as shown in Figure 2. The inner end of the cylinder chamber 35 is partially closed forming an annular seat 37 and providing an opening 38 into the inner end of the chamber. The outer end of the chamber 35 is closed by a plug 39 provided with small vent holes 40.

Disposed in the outer portion of the chamber 35 between the outer end of the piston 36 and the plug 39 is a pressure controlling coil spring 41, while disposed in the inner portion of the chamber between the inner end of the piston and the annular seat 37 is a vacuum controlling coil spring 42. These springs 41 and 42 act to normally retain the piston 36 in a closed intermediate position and permit displacement of the piston in either direction in accordance with pressure variations occurring in the shock absorber.

Provided in the wall of the piston 36 adjacent the outer end of the piston is an annular groove 43, while adjacent the inner end of the piston is an annular groove 44. Formed diametrically thru the piston at the annular groove 43 is a transverse passageway 45 which communicates at its ends with the groove 43 at diametrically opposite sides of the piston. A diametrically formed passageway 46 is also provided in the piston at the annular groove 44 and communicates at its ends with this groove. Extending axially of the piston from the inner end thereof to the transverse passageway 45 is a longitudinal passageway 47 providing communication between the annular grooves 43 and 44 and the chamber 35 at the inner end of the piston. A suitable sealing ring 48 is disposed in an annular recess 49 provided in the piston between the annular groove 44 and the inner end of the piston. Thus it will be seen that the annular grooves 43 and 44 are at all times in communication with the interior of the shock absorber thru the opening 38 at the inner end of the valve body 32. The valve body 32 is provided with ducts 50 which are normally closed by the piston 36 when the latter is in the intermediate position shown in Figure 2.

A dust cap 51 is disposed over the outer end of the valve body 32 and has a pressed fit on an annular shoulder 52. The internal diameter of the dust cap 51 is greater than the external diameter of the valve body 32, and a suitable filter material 53 is disposed between the dust cap and the valve body to cover the ducts 50. The dust cap 51 is provided with suitable apertures 54 which are offset from the ducts 50 as shown in Figure 2 whereby air passing inwardly thru the apertures 54 must travel thru the filter material and be filtered before entering the ducts 50.

In use of the invention in connection with a hydraulic shock absorber, the required amount of resistance fluid is placed in the shock absorber thru the filler opening 31 and the equalizing valve device B is then threaded into the opening as a closure therefor. During operation of the shock absorber, should an excess pressure build up in the shock absorber due to expansion of the resistance fluid, this pressure will pass thru the opening 38 into the chamber 35 of the equalizing device B and force the piston 36 outwardly against the tension of the spring 41. If this pressure which has built up is sufficiently above normal so as to prevent proper operation of the shock absorber, the piston 36 will be forced outwardly until the inner annular groove 44 aligns with the ducts 50 whereupon the air or gas will be permitted to escape thru the apertures 54 and release any excessive pressure in the chambers of the shock absorber. The apertures 40 in the closure plug 39 will permit air to pass into and out of the outer end of the chamber 35 during movement of the piston 36. Should a vacuum occur in the chambers of the shock absorber, the piston will be drawn inwardly against the tension of the spring 42 until the outer annular groove 43 aligns with the ducts 50 whereupon air will be admitted thru the apertures 54 for relieving this sub-normal condition in the shock absorber.

Thus it will be seen that the equalizing valve device not only functions to release excessive pressure, but as a means for automatically maintaining a balance between conditions of excess pressure and sub-normal vacuum. As before stated, excess pressure if allowed to build up in the shock absorber not only prevents proper operation, but also causes a loss of the resistance fluid thru escape of the fluid past the packing gasket 30. Likewise, when a vacuum or sub-normal condition exists in the shock absorber, its operating efficiency is also reduced. The device of this invention provides for a balanced condition in the shock absorber at all times, regardless of variations caused by temperature changes.

While the invention has been shown by way of example embodied in a hydraulic shock absorber having a rotary regulating valve, the device is applicable to other forms of shock absorbers having various types of control means, such as tapered regulating valves or a thermostatic control disc.

Changes in detail may be made to the form of invention herein shown and described, without departing from the spirit of the invention or the scope of the following claims.

I claim:

1. A hydraulic shock absorber comprising a casing having a replenishing chamber, and means for maintaining a balance between conditions of excess pressure and sub-normal vacuum in the replenishing chamber and normally sealing the replenishing chamber against entrance and egress of air with the exterior of the casing.

2. A hydraulic shock absorber comprising a casing having a replenishing chamber provided with a filler opening, and means normally sealing the filler opening against entrance and egress of air and automatically operable to maintain a pressure balance in the replenishing chamber.

3. A hydraulic shock absorber comprising a casing having a fluid filler opening, and an equalizing valve device normally closing the filler opening and responsive to pressure variations in the casing for relieving conditions of excess pressure and sub-normal vacuum occurring in the casing.

4. In combination with a hydraulic shock absorber comprising a casing having a fluid filler opening, a closure device for the filler opening embodying a biased valve member displaceable in either direction in accordance with pressure variations in the casing for maintaining a pressure balance in the casing.

5. In combination with a hydraulic shock absorber comprising a casing having a fluid filler opening, a closure device for the filler opening embodying a biased valve member displaceable in either direction in accordance with pressure variations in the casing for maintaining a pressure balance in the casing, and means for filtering passage of air thru the closure device in either direction.

6. In combination with a hydraulic shock absorber comprising a casing having a fluid filler opening; a closure device for the filler opening comprising a tubular valve body secured in the filler opening and having a valve chamber formed with an annular series of ducts, a valve member slideable in the chamber having an annular groove adjacent each end thereof, an axial passageway opening at the inner end of the valve member, and transverse passageways between the grooves and the axial passageway, a spring acting upon each end of the valve member and normally retaining the valve member with said annular grooves out of registering relation to said ducts, and an apertured cover fitting over the outer end of the valve body.

HARRY C. KRAUSS.